United States Patent
Yagi

(10) Patent No.: US 7,320,093 B2
(45) Date of Patent: Jan. 15, 2008

(54) STORAGE APPARATUS

(75) Inventor: Satoshi Yagi, Ooi (JP)

(73) Assignee: Hitachi, Ltd., Tokyo (JP)

( * ) Notice: Subject to any disclaimer, the term of this patent is extended or adjusted under 35 U.S.C. 154(b) by 569 days.

(21) Appl. No.: 11/020,143

(22) Filed: Dec. 27, 2004

(65) Prior Publication Data

US 2006/0107124 A1   May 18, 2006

(30) Foreign Application Priority Data

Nov. 4, 2004  (JP) ............... 2004-320102

(51) Int. Cl.
  *G06F 11/00*  (2006.01)
(52) U.S. Cl. .......................... 714/50; 714/42
(58) Field of Classification Search ................. 714/50, 714/42, 25, 14, 47
See application file for complete search history.

(56) References Cited

U.S. PATENT DOCUMENTS 5,537,584 A * 7/1996 Miyai et al. ............... 714/42
5,588,144 A  12/1996 Inoue et al.
5,596,708 A * 1/1997 Weber .......................... 714/6
6,038,618 A * 3/2000 Beer et al. .................. 710/18

FOREIGN PATENT DOCUMENTS

EP  000964336 A2 * 12/1999

* cited by examiner

*Primary Examiner*—Nadeem Iqbal
(74) *Attorney, Agent, or Firm*—Reed Smith LLP; Stanley P. Fisher, Esq.; Juan Carlos A. Marquez, Esq.

(57) ABSTRACT

This invention provides a storage apparatus which can avoid a data lost even when a short-circuit fault occurs in a power source line which is not made redundant for a plurality of hard disk drives. In the storage apparatus, a storage control unit comprises a host interface control unit, a disk interface control unit, a cache memory, and a data transfer unit, and a storage unit includes poly switches provided for each of the power source lines to a plurality of hard disk drives and a power source line monitor circuit for monitoring the voltage of the power source line. When the voltage abnormality due to a voltage drop of the power source line is detected by the power source line monitor circuit, a data line connecting the disk interface control unit and the plurality of hard disk drives is cut off.

20 Claims, 15 Drawing Sheets

RAID 5 IS COMPOSED OF 4D + 1P

STORAGE APPARATUS

CROSS-REFERENCE TO RELATED APPLICATION

The present application claims priority from Japanese patent application No. JP 2004-320102 filed on Nov. 4, 2004, the content of which is hereby incorporated by reference into this application.

BACKGROUND OF THE INVENTION

The present invention relates to a storage apparatus and, in particular, to a technique effectively applied to a data lost avoidance when a fault occurs in a power source line of a hard disk drive.

Heretofore, there has been a technique which enables a hot swap of each package in the apparatus in order to achieve a non-stop operation of the apparatus when the fault of the storage apparatus has occurred, and which does not exert any influence on an operation of the apparatus at the time of the hot swap of each package (See, for example, Japanese Patent Laid-open No. 7-160380).

Further, in recent years, the amount of data stored in the storage apparatus has become increasingly large. With the increase of the data to be stored, the necessity of avoiding the data lost at the time of occurrence of the fault has been further increased.

Hence, it has become necessary to avoid the data lost even when a short-circuit fault occurs in the power source line that is not made redundant to a plurality of hard disk drives.

SUMMARY OF THE INVENTION

However, in the case of a technique disclosed in Japanese Patent Laid-open No. 7-160380, there has been the following problem. That is, no consideration is paid to the case where the short-circuit fault occurs in the power source line that is not made redundant to the plurality of hard disk drives. In this case, when the short-circuit fault occurs in the power source line of one hard disk drive, a voltage of the whole power source line is lowered and not only the hard disk drive in which the short-circuit fault occurs but other hard disk drives are also reset, thereby causing the data lost.

Hence, an object of the present invention is to provide a storage apparatus, which can avoid the data lost even when the short-circuit fault occurs in the power source line that is not made redundant to the plurality of hard disk drives.

Outlines of representative ones of the inventions disclosed in this application will be briefly described as follows.

The storage apparatus according to the present invention comprises: a storage control unit; and a storage unit composed of a plurality of physical storage devices, wherein the storage control unit includes: a host interface control unit for controlling a data transfer with a host device; a disk interface control unit for controlling the data transfer with the storage unit; a cache memory for temporarily storing the data; and a data transfer unit which is connected to the host interface control unit, the disk interface control unit, and the cache memory, and controls the data transfer, the storage unit is provided for each power source line to the plurality of physical storage devices and includes a switch for shutting the power supply to the physical storage device when an excess current to the physical storage device is detected and a power source line monitor circuit for monitoring a voltage of the power source line, and when a voltage abnormality due to a voltage drop of the power source line is detected by the power source line monitor circuit, a data line connecting the disk interface control unit and the plurality of physical storage devices is cut off.

Also, the storage apparatus according to the present invention comprises: a storage control unit; and a storage unit composed of a plurality of physical storage devices, wherein the storage control unit includes: a host interface control unit for controlling a data transfer with a host device; a disk interface control unit for controlling the data transfer with the storage unit; a cache memory for temporarily storing the data; and a data transfer unit which is connected to the host interface control unit, the disk interface control unit, and the cache memory, and controls the data transfer, the storage unit is provided for each power source line to the plurality of physical storage devices and includes a switch for shutting the power supply to the physical storage device when an excess current to the physical storage device is detected, and when the abnormality of the physical storage device is detected, the storage control unit allows an access to the physical storage device from the host device to wait until a certain period of time passes.

DESCRIPTION OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

<Configuration of Storage Apparatus>

Figure 1:
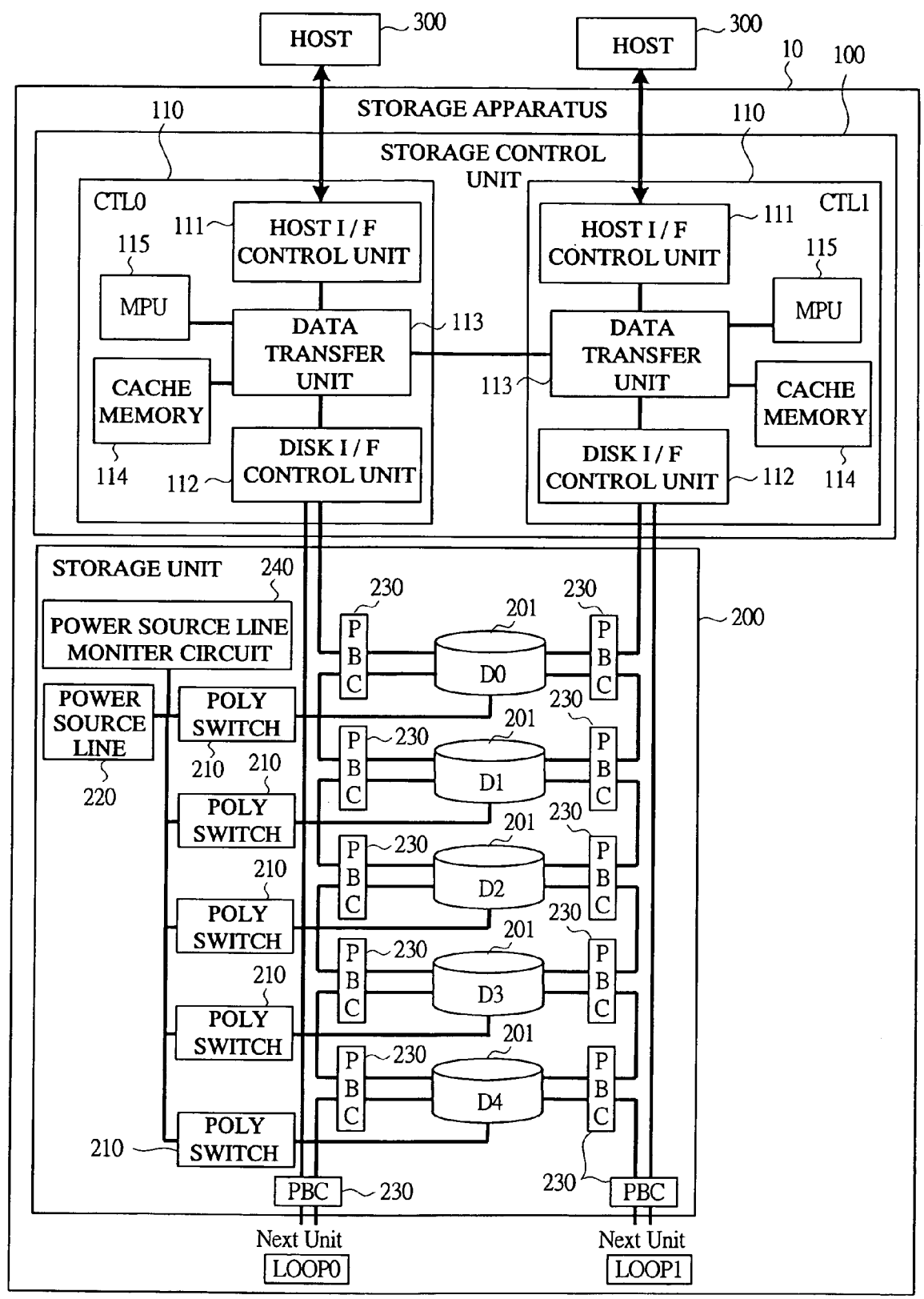
FIG. 1 is a block diagram showing a configuration of a storage apparatus according to a first embodiment of the present invention.

A configuration of a storage apparatus according to a first embodiment of the present invention will be described with reference to FIG. 1. FIG. 1 is a block diagram showing the configuration of the storage apparatus according to the first embodiment of the present invention.

In FIG. 1, a storage apparatus 10 is composed of a storage control unit 100 and a storage unit 200.

The storage control unit 100 comprises storage controller boards (CTL0 and CTL1) 110 including a host interface control unit 111, a disk interface control unit 112, a data transfer unit 113, a cache memory 114, and a central processing unit (MPU) 115.

The host interface control unit 111 comprises a communication interface for performing a communication with a host (host device) 300, and controls the data reception from the host 300 and the data transmission to the host 300.

The disk interface control unit 112 comprises the communication interface for performing the communication with a storage unit 200, and controls a data transmission to a hard disk drive (physical storage device) 201 within the storage unit 200 and a data reception from the physical storage device 201.

The data transfer unit 113 controls the data transfer between the host interface control unit 111 and the cache memory 114, between the disk interface control unit 112 and the cache memory 114, and between the storage controller board (CTL0) 110 and the storage controller board (CTL1) 110.

The cache memory 114 temporarily stores the data transmitted and received between the host 300 and the storage unit 200.

The storage unit 200 comprises a plurality of hard disk drives (D0, D1, D2, D3, and D4) 201, and the RAID (Redundant Arrays of Inexpensive Disks) is composed of a plurality of hard disk drives 201.

The plurality of hard disk drives 201 are supplied with a power source from a common power source line 220 through the poly switches 210, and when the short-circuit fault and the like occur in the power source line of the hard disk drives 201, the supply of the power source to the hard disk drives 201 in which the short-circuit fault and the like occur is shut off by using the poly switches 210.

The poly switch 210 is a switch which shuts off the power supply to the hard disk drive 201 when detecting an excess current, and restarts the power supply to the hard disk drive 201 when the fault of the power source line of the hard disk drive 201 is restored and the excess current is not detected.

The power source line 220 is connected to a power source line monitor circuit 240, which monitors the voltage change of the power source line 220.

The disk interface control unit 112 and a plurality of hard disk drives 201 are connected in loop-shape by fiber channel, and connecting portion between the fiber channel and the hard disk drive 201 is connected to port bypass circuits (PBC) 230. By the port bypass circuit 230, a control of connection and disconnection of the hard disk drive 201 and those of the fiber channel line is performed.

The storage unit 200 of a separate chassis other than the storage apparatus 10 can be connected to the storage apparatus 10, and the storage unit 200 within the storage apparatus 10 and the storage unit 200 of a separate chassis can be connected to each other through the port bypass circuit 230.

<Operation of Poly Switch at the Time of Short Circuit of Power Source Line>

Figure 2:
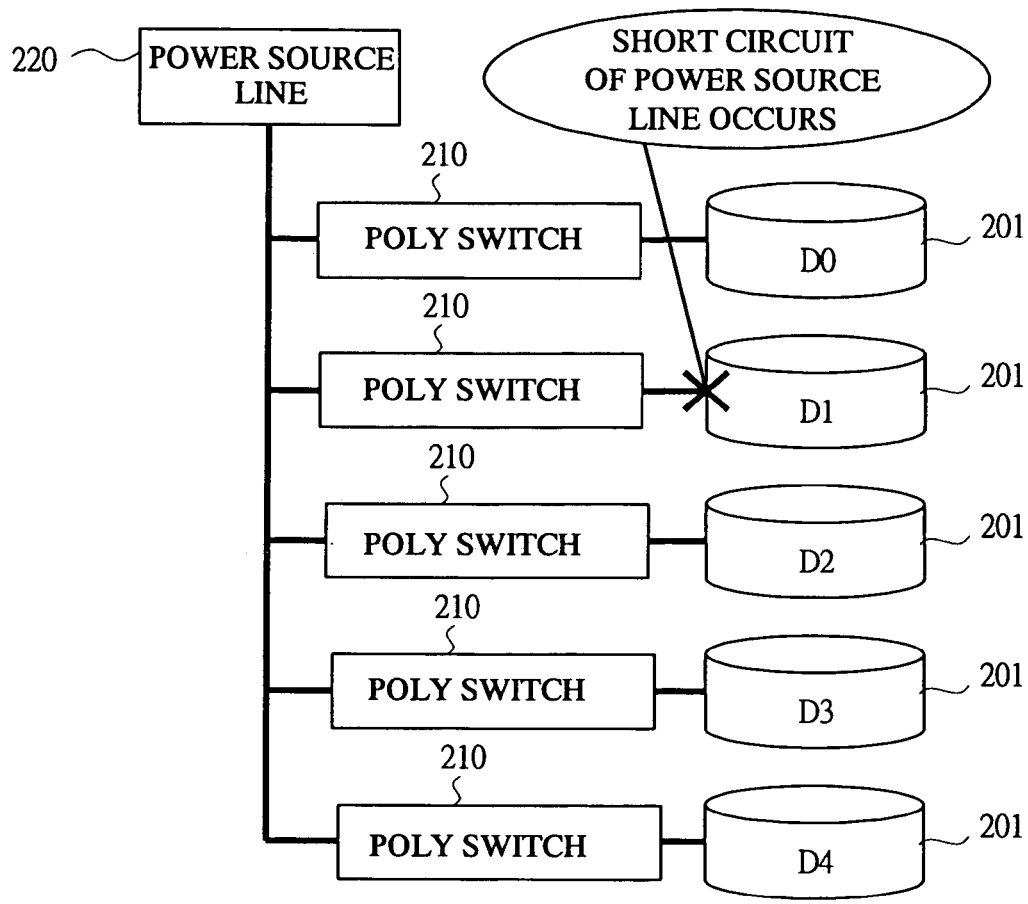
FIG. 2 is a schematic diagram for explaining an operation of a poly switch at the time of short circuit of a power source line in the storage apparatus according to the first embodiment of the present invention.
Figure 3:
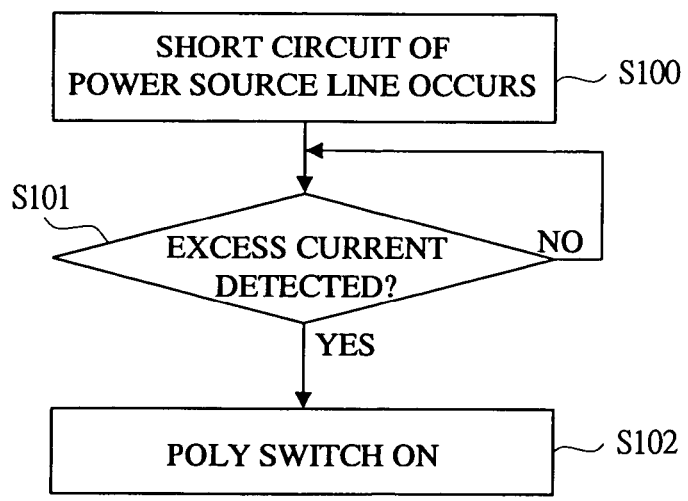
FIG. 3 is a flowchart showing the operation of the poly switch at the time of short circuit of a power source line in the storage apparatus according to the first embodiment of the present invention.
Figure 4:
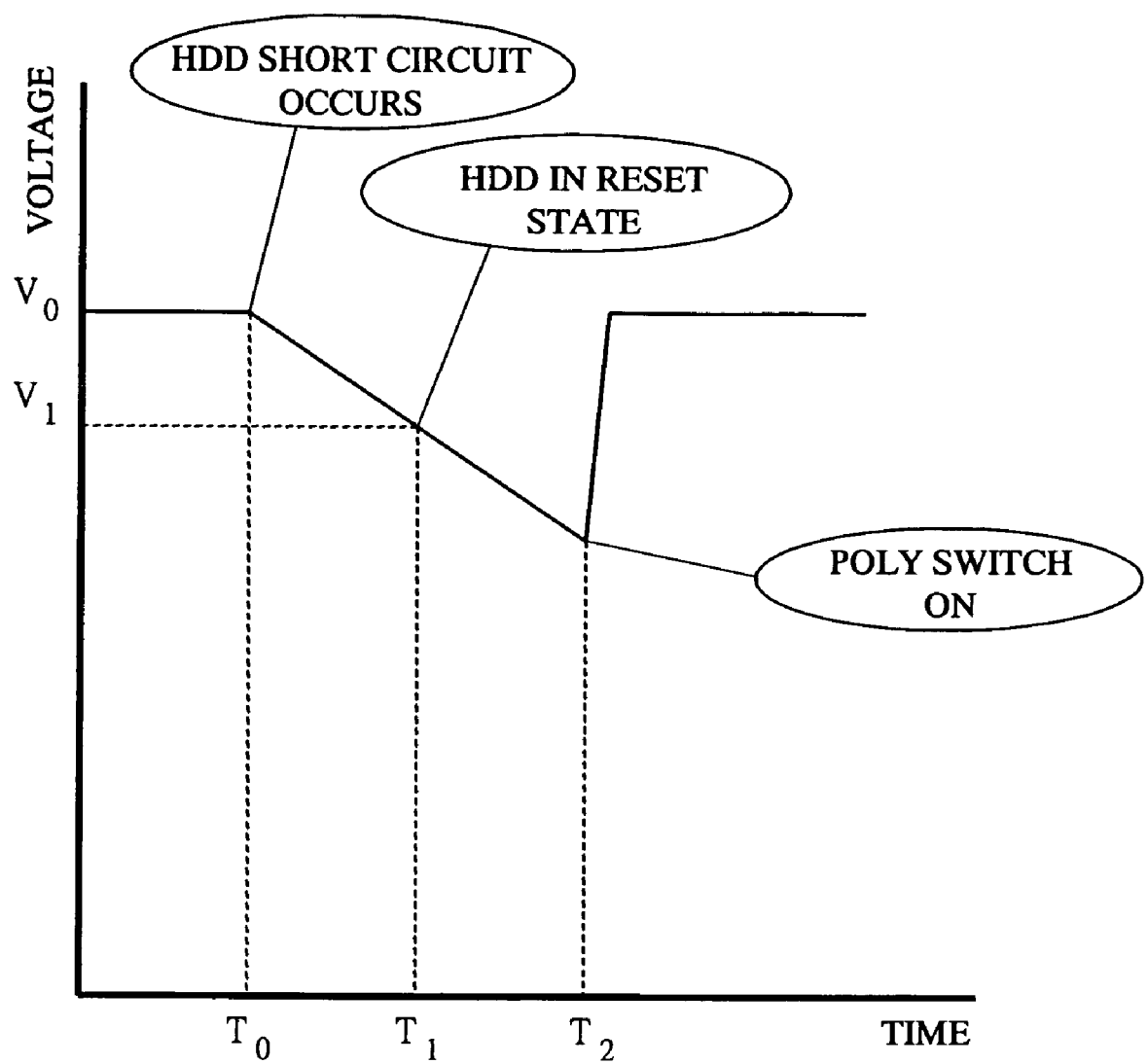
FIG. 4 is a view showing a change of a voltage at the time of short circuit of a power source line in the storage apparatus according to the first embodiment of the present invention.

Next, the operation of the poly switch at the time of the short circuit of the power source line in the storage apparatus according to the first embodiment of the present invention will be described with reference to FIGS. 2 to 4. FIG. 2 is a schematic diagram for explaining the operation of the poly switch at the time of the short circuit of the power source line in the storage apparatus according to the first embodiment of the present invention, and shows only the hard disk drives 201, the power source line 220, and the ploy switches 210. FIG. 3 is a flowchart showing the operation of the poly switch at the time of the short circuit of the power source line in the storage apparatus according to the first embodiment of the present invention, and FIG. 4 is a view showing a change of a voltage at the time of the short circuit of the power source line in the storage apparatus according to the first embodiment of the present invention.

First, in the case where a short circuit occurs in the power source line of the hard disk drive (D1) 201 as shown in FIG. 2, the excess current is detected (S101) in the poly switch 210 after the short circuit occurs in the power source line (S100), and the poly switch 210 is turned ON (S102) as shown in FIG. 3.

When the poly switch 210 is turned ON, the power supply to the hard disk drive (D1) 201 from the poly switch 210 is shut off.

Although the power supply to the hard disk drive (D1) 201 in which the short circuit occurs in the power source line is shut off by the operation as shown in FIG. 3, since a certain period of time (for example, 20 mS) is required until the poly switch 210 is turned ON, the voltage of the power source line is lowered due to the short-circuit fault during that period of time.

Next, this lowering of the voltage will be described.

As shown in FIG. 4, in a state where the short circuit does not occur in the power source line of the hard disk drive (D1) 201, a plurality of hard disk drives 201 are supplied with the power of a voltage $V_0$.

In the case where the short circuit occurs in the power source line of the hard disk drive (D1) 201 at the time $T_0$ and the poly switch 210 is turned ON at the time $T_2$, the voltage of the hard disk drive 201 becomes equal to or lower than the operating voltage $V_1$ at the time $T_1$ before reaching the time $T_2$, and all the hard disk drives 201 are put into a reset state.

In this reset state, the operation of all the hard disk drives 201 is stopped, and when an access is made from the host 300, not only the hard disk drive (D1) 201 in which the short-circuit fault occurs but other hard disk drives (D0, D2, D3 and D4) 201 are shut down, thereby causing a data lost.

Hence, in this embodiment, the data lost is prevented in the manner as described later.

<Operation at the Time of Short Circuit of Power Source Line>

Figure 5:
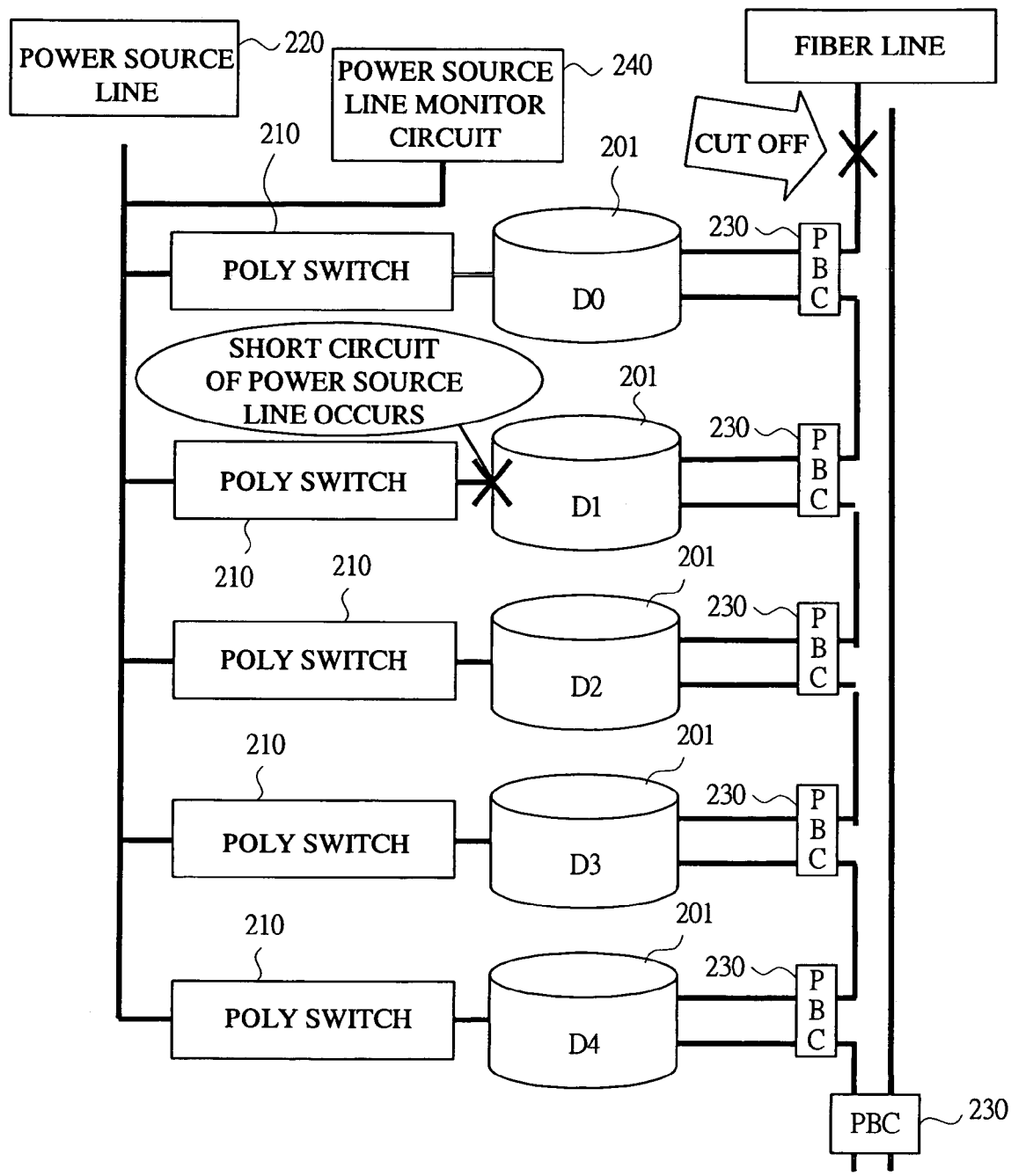
FIG. 5 is a schematic diagram for explaining the operation at the time of short circuit of a power source line in the storage apparatus according to the first embodiment of the present invention.
Figure 6:
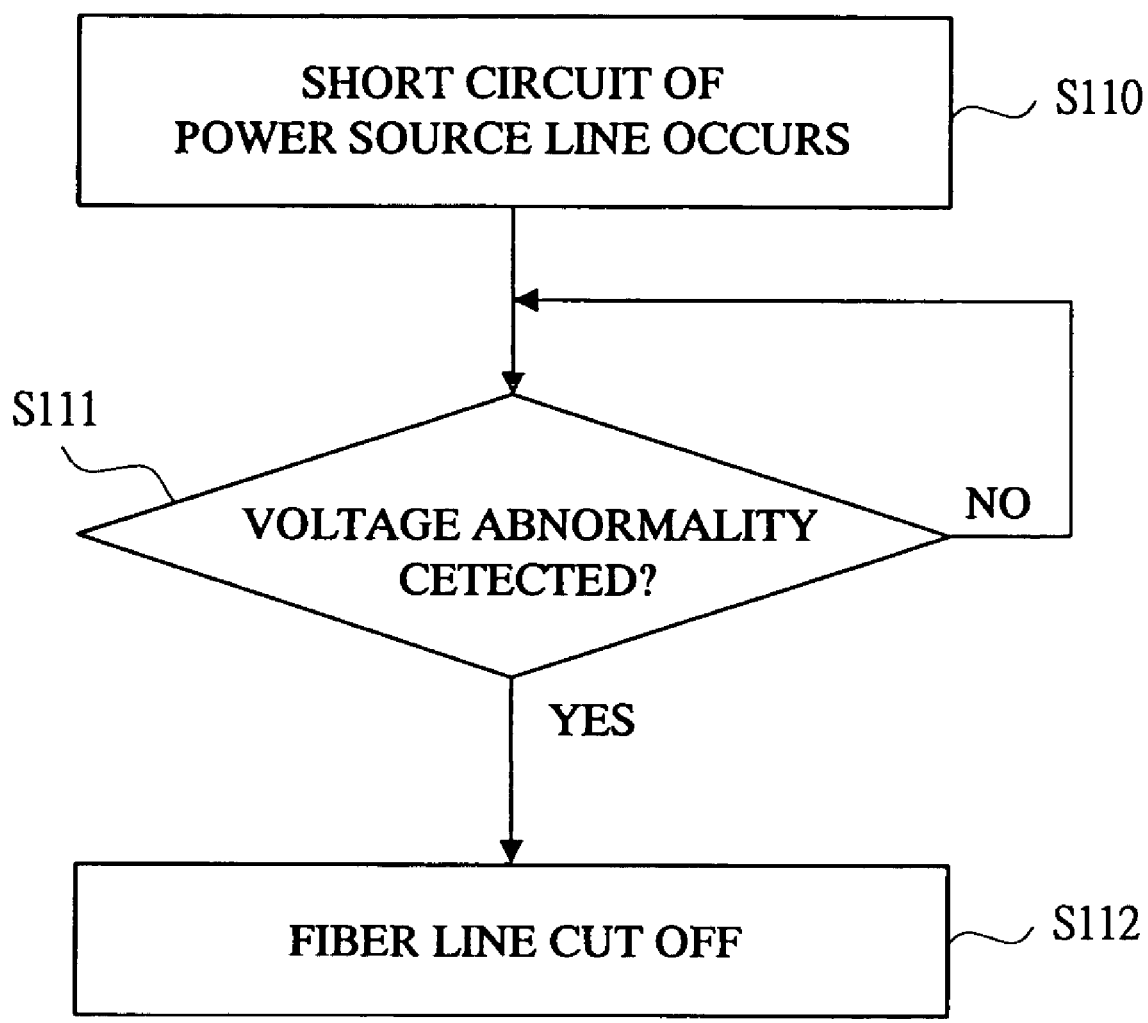
FIG. 6 is a flowchart showing the operation at the time of short circuit of a power source line in the storage apparatus according to the first embodiment of the present invention.

Next, the operation at the time of short circuit of the power source line in the storage apparatus according to the first embodiment of the present invention will be described with reference to FIGS. 5 to 7. FIG. 5 is a schematic diagram for explaining the operation at the time of short circuit of the power source line in the storage apparatus according to the first embodiment of the present invention, and shows only the hard disk drive 201, the power source line 220, the poly switch 210, the power source line monitor circuit 240, and the port bypass circuit 230. Further, FIG. 5 shows only the connection to the fiber line from the one disk interface control unit 112, and the operation at the time of the short circuit of the power source line is the same also in the case of the connection to the fiber line from the other disk interface control unit 112. FIG. 6 is a flowchart showing the operation at the time of short circuit of the power source line in the storage apparatus according to the first embodiment of the present invention, and FIG. 7 is a view showing the change of the voltage at the time of short circuit of the power source line in the storage apparatus according to the first embodiment of the present invention.

First, as shown in FIG. 5, when the short circuit occurs in the power source line of the hard disk drive (D1) 201, an operation to turn ON the poly switch 210 is performed by the operation as shown in FIG. 3.

Further, as shown in FIG. 6, the power source line monitor circuit 240 monitors the change of the voltage of the power source line 220, and when a voltage abnormality is detected by the power source line monitor circuit 240 (S111) after the short circuit occurs in the power source line of the hard disk drive (D1) 210 (S110), the fiber line by the fiber channel from the disk interface control unit 112 is cut off by the port bypass circuit 230 and the like (S112).

Figure 7:
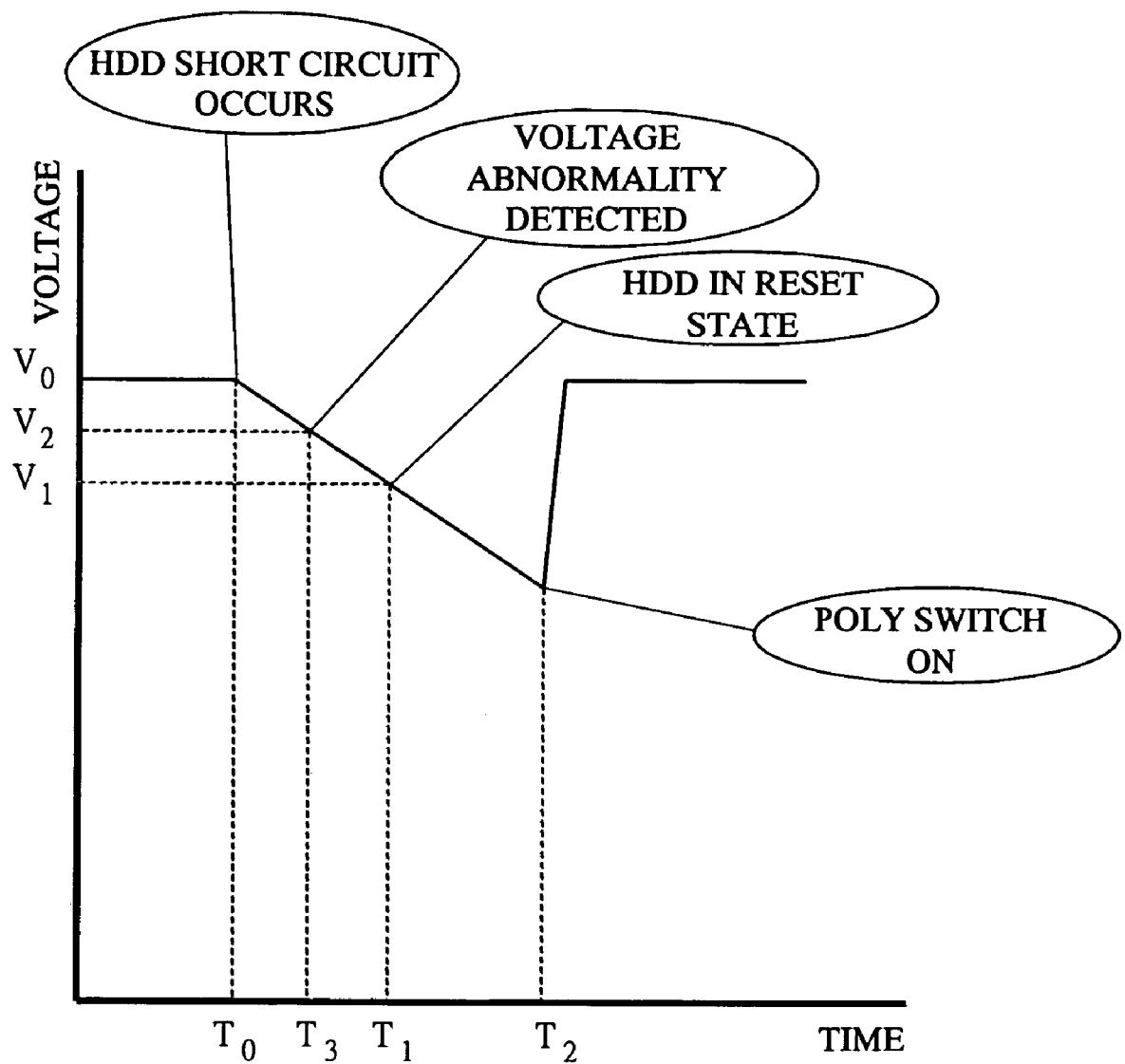
FIG. 7 is a view showing the change of the voltage at the time of short circuit of a power source line in the storage apparatus according to the first embodiment of the present invention.

In this change of the voltage at the time of cutting off the fiber line, as shown in FIG. 7, the voltage abnormality is detected at the point of the voltage $V_2$ at the time $T_3$ before the voltage of the power source line 220 becomes equal to or lower than the operating voltage $V_1$ of the hard disk drive 201, and the fiber line is cut off.

Hence, when the access is made from the host 300, this is recognized as an abnormality of the fiber line connecting the disk interface control unit 112 and the hard disk drive 201 because the fiber line is cut off. As a result, the loop is shut down, which leads to the state of a sub-system down, and the hard disk drive 201 itself is not shut down.

At the time $T_2$ shown in FIG. 7, the poly switch 210 is turned ON, and when the power supply to the hard disk drive (D1) 201 is shut off, the voltage of the power source line 220 is returned to the ordinary voltage $V_0$.

In the power source line monitor circuit 240, the poly switch 210 which is connected to the hard disk drive (D1) 201 in which the short circuit occurs in the power source line is turned ON, and when the voltage abnormality is not detected, the cut off fiber loop is restored and becomes a normal fiber loop state.

Then, a spin up command is transmitted to each hard disk drive 201, and after each hard disk drive 201 is activated, the operation proceeds to the normal access process.

In this case, since the power supply to the hard disk drive (D1) 201 in which the short circuit occurs in the power source line is shut off by the poly switch 210, the hard disk drive is shut down. However, other hard disk drives (D0, D2, D3 and D4) 201 are not shut down, and can continue to perform the ordinary operations.

Hence, since there are a plurality of hard disk drives 201 which do not shut down, it is possible to prevent the data lost.

Also, the hard disk drive (D1) 201 which is shut down is subsequently exchanged by a correction copy and a copy back so as to be able to perform the ordinary operation.

<Correction Copy Process and Copy Back Process>

Figure 8:
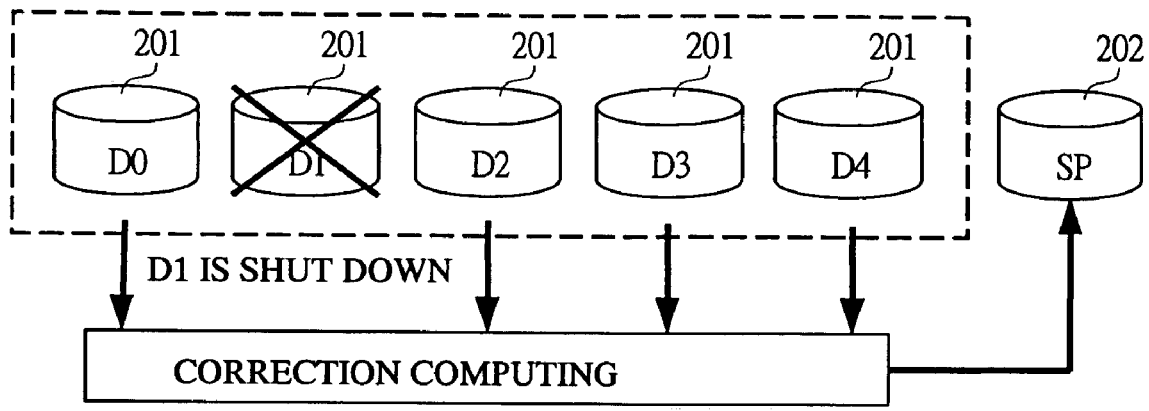
FIG. 8 is an explanatory drawing for explaining a correction copy process after shutting down a hard disk drive in the storage apparatus according to the first embodiment of the present invention.
Figure 9:
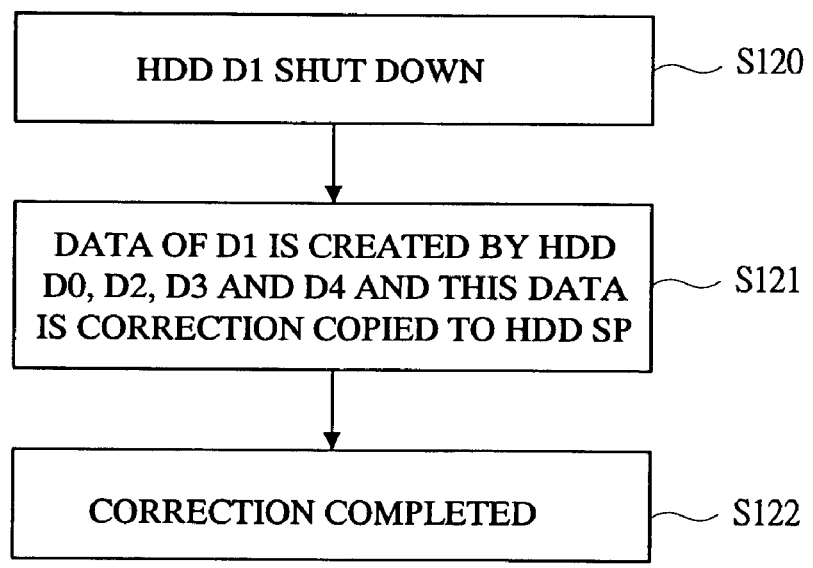
FIG. 9 is a flowchart showing the operation of the correction copy process after shutting down a hard disk drive in the storage apparatus according to the first embodiment of the present invention.

Next, a correction copy process and a copy back process after shutting down the hard disk drive in the storage apparatus according to the first embodiment of the present invention will be described with reference to FIGS. 8 to 11. FIG. 8 is an explanatory drawing for explaining the correction copy process after shutting down the hard disk drive in the storage apparatus according to the first embodiment of the present invention, FIG. 9 is a flowchart showing the operation of the correction copy process after shutting down the hard disk drive in the storage apparatus according to the first embodiment of the present invention, FIG. 10 is an explanatory drawing for explaining the copy back process after shutting down the hard disk drive in the storage apparatus according to the first embodiment of the present invention, and FIG. 11 is a flowchart showing the operation of the copy back process after shutting down the hard disk drive in the storage apparatus according to the first embodiment of the present invention.

First, in this embodiment, a RAID 5 is composed of 4D+1P as shown in FIG. 8. For example, when the hard disk drive (D1) 201 is shut down, as shown in FIG. 9, after shutting down the hard disk drive (S120), a correction computing is performed from the data of other hard disk drives (D0, D2, D3, and D4) 201, and the data of the hard disk drive (D1) 201 is created. Then, by performing the correction copy to a spare hard disk drive (SP) 202 (S121), the correction is completed (S122).

Figure 10:
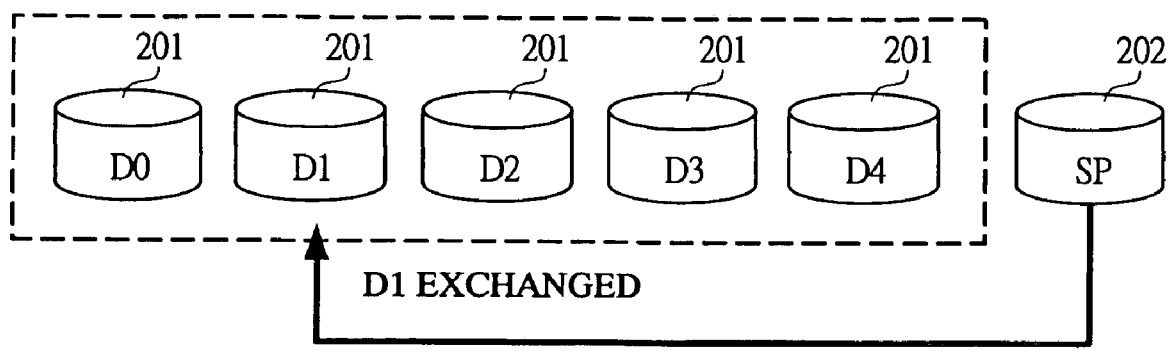
FIG. 10 is an explanatory drawing for explaining a copy back process after shutting down a hard disk drive in the storage apparatus according to the first embodiment of the present invention.
Figure 11:
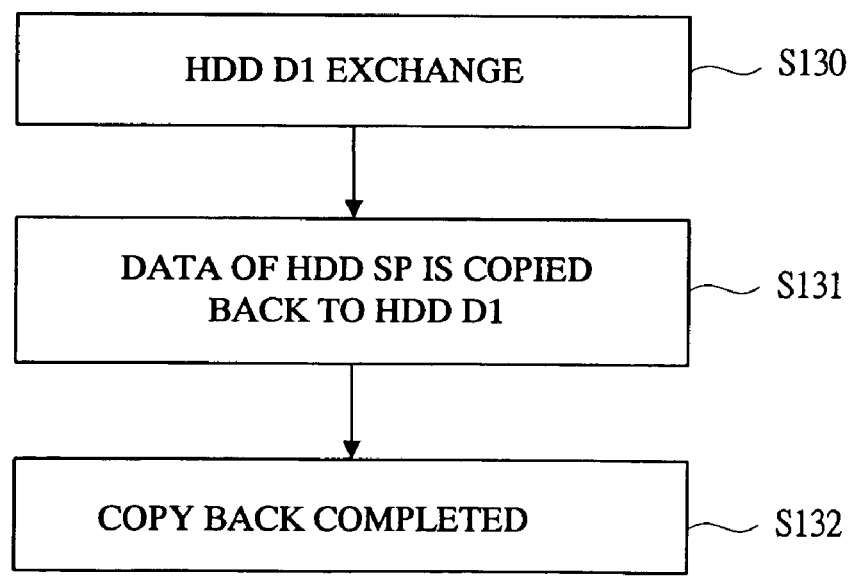
FIG. 11 is a flowchart showing the operation of the copy back process after shutting down a hard disk drive in the storage apparatus according to the first embodiment of the present invention.

When the correction copy is completed, as shown in FIG. 10, the hard disk drive (D1) 201 which is shut down is exchanged, and, as shown in FIG. 11, after exchanging the hard disk drive (D1) 201 (S130), the data of the hard disk drive (SP) 202 is copied back to the exchanged hard disk drive (D1) 201 (S131), thereby completing the copy back process (S132).

By the above-described correction copy process and the copy back process, the hard disk drive (D1) 201 in which the short circuit occurs in the power source line and its hard disk drive is shut down is restored to the normal state and can perform the ordinary process.

In this embodiment, the description has been made based on the configuration example comprising two storage controller boards (CTL0 and CTL1) 110 inside the storage control unit 100. However, even in the configuration controlled by one storage controller board 110, the same control as the present embodiment can be performed.

Second Embodiment

In the first embodiment, the description has been made by using an example of the hard disk drive 201 of the fiber channel drive connected by the fiber channel. However, even in a SATA drive connected by a serial ATA (SATA), the operation at the time of the short-circuit fault of the power source line can be performed in the same manner.

<Configuration of Storage Apparatus>

Figure 12:
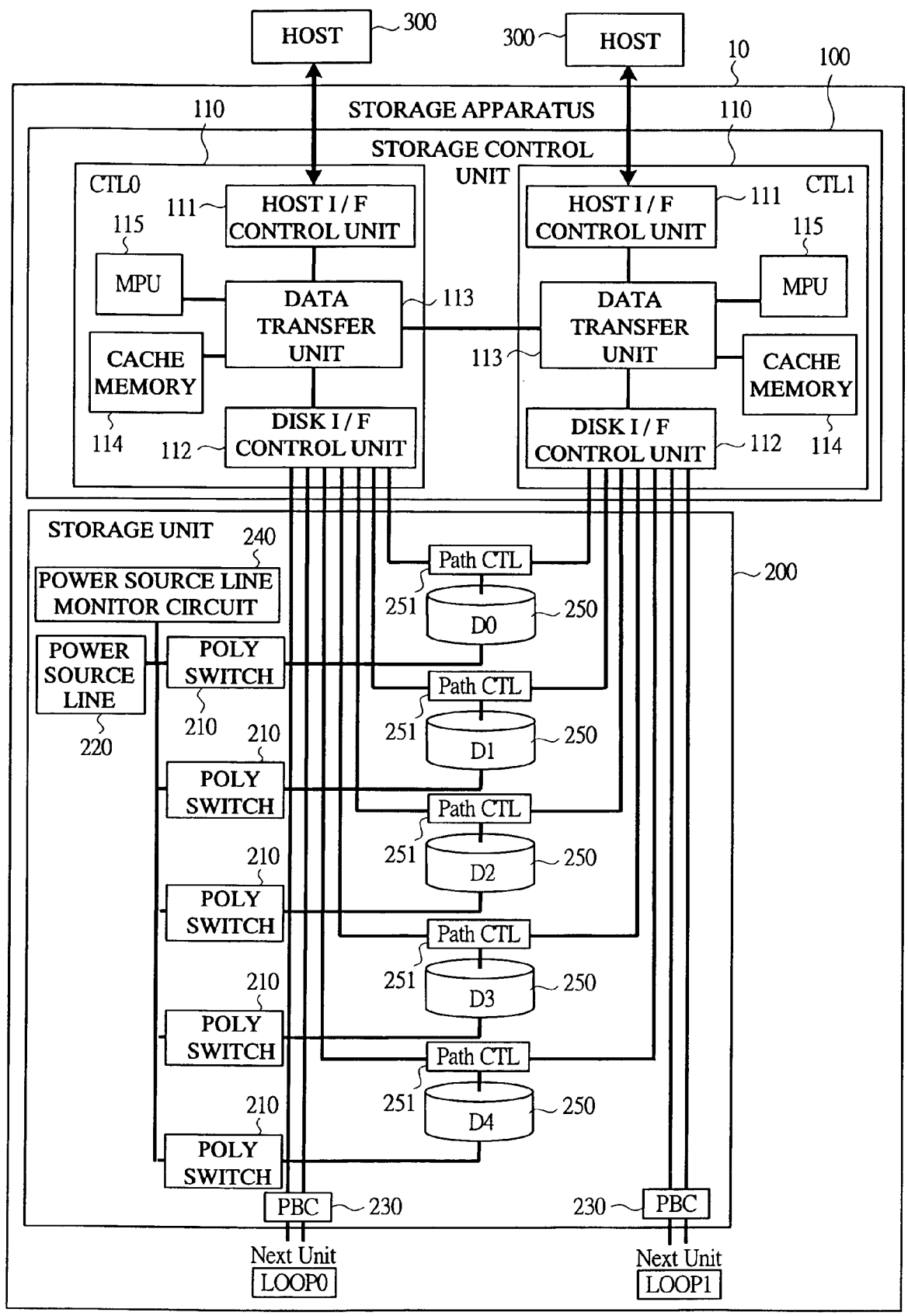
FIG. 12 is a block diagram showing a configuration to which a SATA drive is connected in the storage apparatus according to a second embodiment of the present invention.

A configuration in which a SATA drive of a storage apparatus is connected according to a second embodiment of the present invention will be described with reference to FIG. 12. FIG. 12 is a block diagram showing the configuration to which the SATA drive is connected in the storage apparatus according to the second embodiment of the present invention.

In FIG. 12, in the case of a hard disk drive 250 of the SATA drive, since the connection is made on a one for one basis, a number of lines corresponding to that of the hard disk drives 250 comes from the disk interface control unit 112 to the hard disk drives 250.

Since the hard disk drive 250 of the SATA drive has only one interface, a logic called a path controller (PathCTL) 251 is added so as to be connected to both of the storage controller boards (CTL0 and CTL1).

The path controller 251 for the connection to both of the storage controller boards (CTL0 and CTL1) 110 can perform the cutting off of the path to the hard disk drive 250 similarly to the port bypass circuit 230 in the first embodiment.

In the case where a connection is made to the storage unit 200 of a separate chassis other than the storage apparatus 10, since the connection cannot be made by a SATA interface, the interface of the fiber channel is used for the connection to the storage unit 200 of the separate chassis similarly to the first embodiment. Other configurations are the same as those of the first embodiment.

<Operation at the Time of Short Circuit of Power Source Line>

In the operation at the time of short circuit of the power source line in the configuration as shown in FIG. 12, when a voltage abnormality is detected by a power source line monitor circuit 240, the SATA line is cut off by the SATA interface from the disk interface control unit 112 by the path controller 251. The other operation is the same as that of the first embodiment.

The connection by a serial attached SCSI (SAS) is also the same as the connection by the SATA.

Other than the above described, even in a daisy chain connection by a parallel bus such as a SCSI bus, the operation at the time of short circuit of the power source line can be performed in the same manner as that of the connection by the fiber channel in the first embodiment.

Third Embodiment

Different from the first embodiment in which the cutting off of a fiber line is performed by the detection of a voltage abnormality by a power source line monitor circuit 240, when the abnormality of a hard disk drive 201 due to the short circuit and the like in the power source line thereof is detected on a storage control unit 100 side, an access from the host 300 is made to wait until a certain period of time passes in the third embodiment.

The configuration of a storage apparatus 10 of the third embodiment is the same as that of the first embodiment except that a power source line monitor circuit 240 is not connected to a power source line 220.

<Operation at the Time of Short Circuit of Power Source Line>

Figure 13:
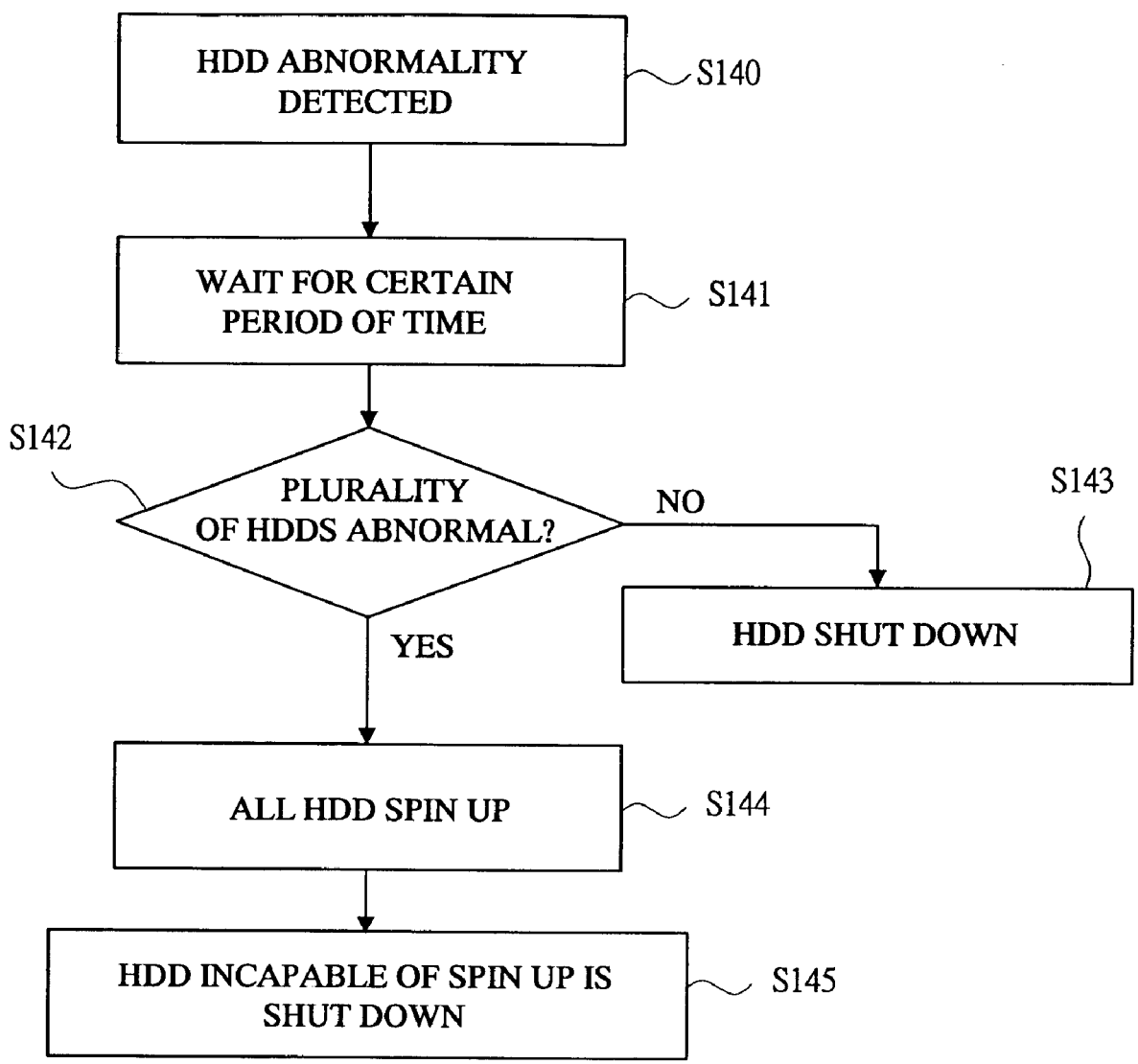
FIG. 13 is a flowchart showing the operation at the time of short circuit of the power source line in the storage apparatus according to a third embodiment of the present invention.
Figure 14:
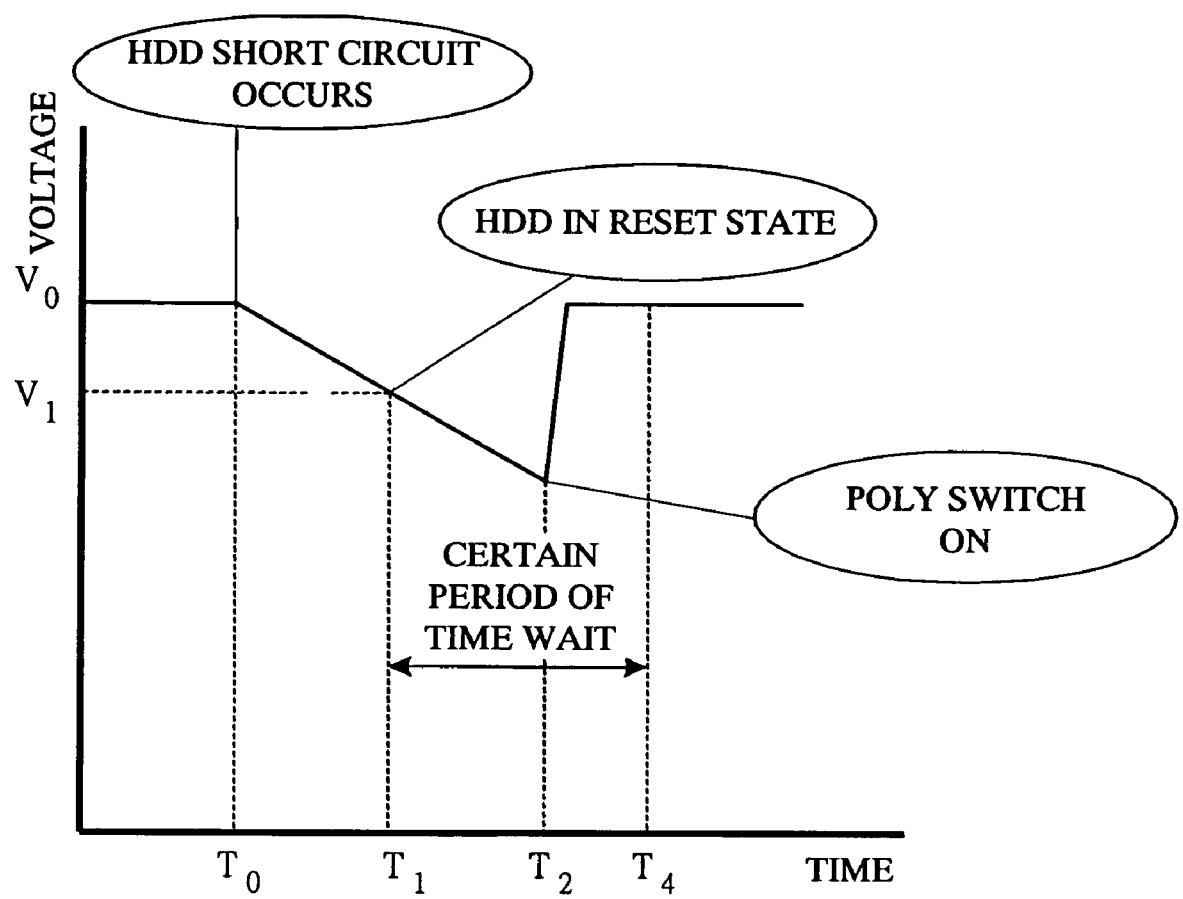
FIG. 14 is a view showing the change of the voltage at the time of short circuit of the power source line in the storage apparatus according to the third embodiment of the present invention.

Next, the operation at the time of short circuit of the power source line in the storage apparatus according to the third embodiment of the present invention will be described with reference to FIGS. 13 and 14. FIG. 13 is a flowchart showing the operation at the time of short circuit of the power source line in the storage apparatus according to the third embodiment of the present invention, and FIG. 14 is a view showing the change of the voltage at the time of short circuit of the power source line in the storage apparatus according to the third embodiment of the present invention.

First, similar to the first embodiment, as shown in FIG. 5, when the short circuit occurs in the power source line of a hard disk drive (D1) 201, the operation to turn ON the poly switch 210 is performed in the same manner as that of the first embodiment shown in FIG. 3.

When the abnormality of a hard disk drive 201 is detected on the storage control unit 100 side by the occurrence of the short circuit and the like in the power source line of the hard disk drive (D1) 210, the operation as shown in FIG. 13 is performed. More specifically, when detecting the abnormality of the hard disk drive 201 (S140), a certain period of waiting time is set, and an access from the host 300 is made to wait until a certain period of time passes (S141).

After the passage of a certain period of time in S141, it is determined whether or not a plurality of hard disk drives 201 are abnormal (S142), and when the plurality of hard disk drives 201 are determined not to be abnormal in S142, it is not that the short circuit occurs in the power source line of the hard disk drive 201 and all the hard disk drives 201 are put into a reset state, but that one hard disk drive 201 is abnormal. Therefore, the hard disk drive 201 is shut down (S143).

Further, when the plurality of hard disk drives 201 are determined to be abnormal in S142, it is determined that the short circuit occurs in the power source line of the hard disk drive 201 and all the hard disk drives 201 are put into a reset state. Then, a spin up command is transmitted to all the hard disk drives 201 (S144), and after the activation of each hard disk drive 201, the operation proceeds to the ordinary access process.

Thereafter, as a result of the activation of the hard disk drive 201 by the transmission of the spin up command in S144, the hard disk drive 201 not capable of the spin up is shut down (S145).

By this operation, for example, even when the short circuit occurs in the power source line of the hard disk drive (D1) 201, the access from the host 300 is put into a waiting state in a period from the time when the abnormality of the hard disk drive 201 is detected to the time when the poly switch 210 connected to the hard disk drive (D1) 201 in which the short circuit occurs in the power source line is turned ON.

Thereafter, the spin up command is transmitted to all the hard disk drives 201, and only the hard disk drive (D1) 201 in which the short circuit occurs in the power source line is shut down, and the other hard disk drives (D0, D2, D3, and D4) 201 are not shut down, and can continue to perform the ordinary operations.

Hence, since a plurality of the hard disk drives 201 are not shut down, it is possible to prevent the data lost.

The hard disk drive (D1) 201 which is shut down is subsequently exchanged by a correction copy and a copy back in the same manner as that in the first embodiment, and can continue to perform the ordinary operation.

As a certain period of time for the waiting in S141 of FIG. 13, as shown in the change of the voltage of FIG. 14, the period of time is set, that is, from the time $T_1$ in which the voltage of the power source line 220 becomes equal to or lower than the operating voltage $V_1$ of the hard disk drive 201, the hard disk drive 201 is put into a reset state, and the abnormality of the hard disk drive 201 is detected to the time $T_4$ subsequent to the time $T_2$ in which the short circuit occurs in the power source line of the hard disk drive 201 and the poly switch 210 is turned ON.

In this way, after the passage of a certain period of time, the poly switch 210 connected to the hard disk drive (D1) 201 in which the short circuit occurs in the power source line is turned ON, and the power supply to the hard disk drive (D1) 201 is shut off, and therefore, the voltage is returned to $V_0$. When the spin up command is transmitted to each hard disk drive 201 at this point of time, the normal hard disk drive 201 can be activated as usual.

In the present embodiment, the abnormality of the hard disk drive 201 is detected at the point of time when the short circuit occurs in the power source line of the hard disk drive 201 and all the hard disk drives 201 are put into a reset state. However, in the case where the access from the host is made to the hard disk drive 201 before the short circuit occurs in the power source line of the hard disk drive 201 and all the hard disk drives are put into a reset state, the abnormality of the hard disk drive 201 can be detected at this point of time, and a certain period of waiting time can be set. Even in this case, by setting a certain period of time till the time $T_4$ subsequent to the time $T_2$ from when the short circuit occurs in the power source line of the hard disk drive 201 and the poly switch 210 is turned ON, the same operation as described in this embodiment can be performed.

Further, even when the SATA drive is connected similarly to the second embodiment, by setting a certain period of waiting time when the abnormality of the hard disk drive 201 of the SATA drive is detected and by making the access from the host 300 wait until the certain period of time passes, it becomes possible to perform the same operation as described in this embodiment.

Fourth Embodiment

In the third embodiment, different from the first embodiment, the cutting off of a fiber line is not performed by the detection of a voltage abnormality by a power source line monitor circuit 240, but an access from the host 300 is made to wait until a certain period of time passes by the detection of a voltage abnormality by the power source line monitor circuit 240.

The configuration of a storage apparatus 10 of the fourth embodiment is the same as that of the first embodiment.

<Operation at the Time of Short Circuit of Power Source Line>

Figure 15:
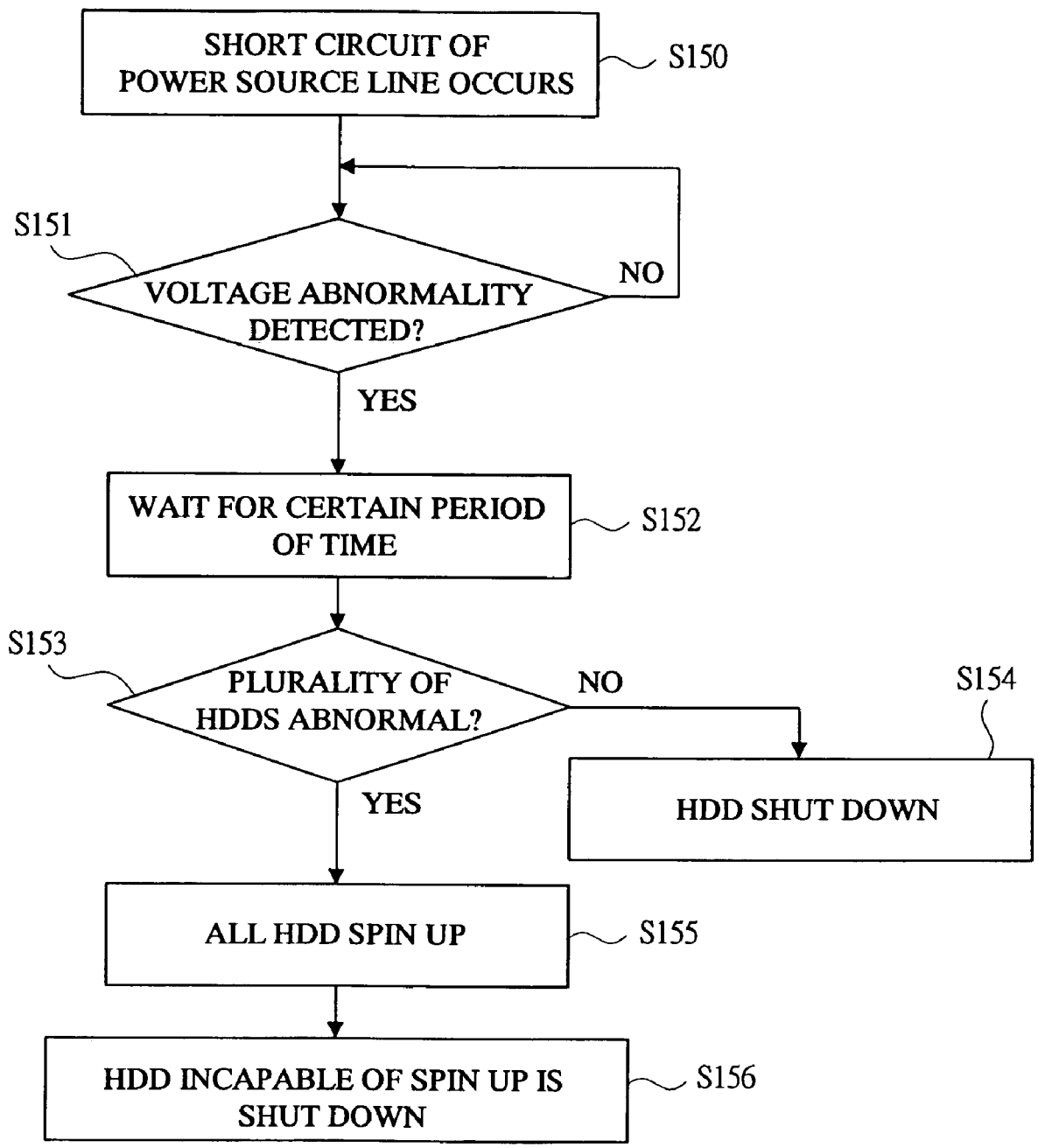
FIG. 15 is a flowchart showing the operation at the time of short circuit of the power source line in the storage apparatus according to a fourth embodiment of the present invention.
Figure 16:
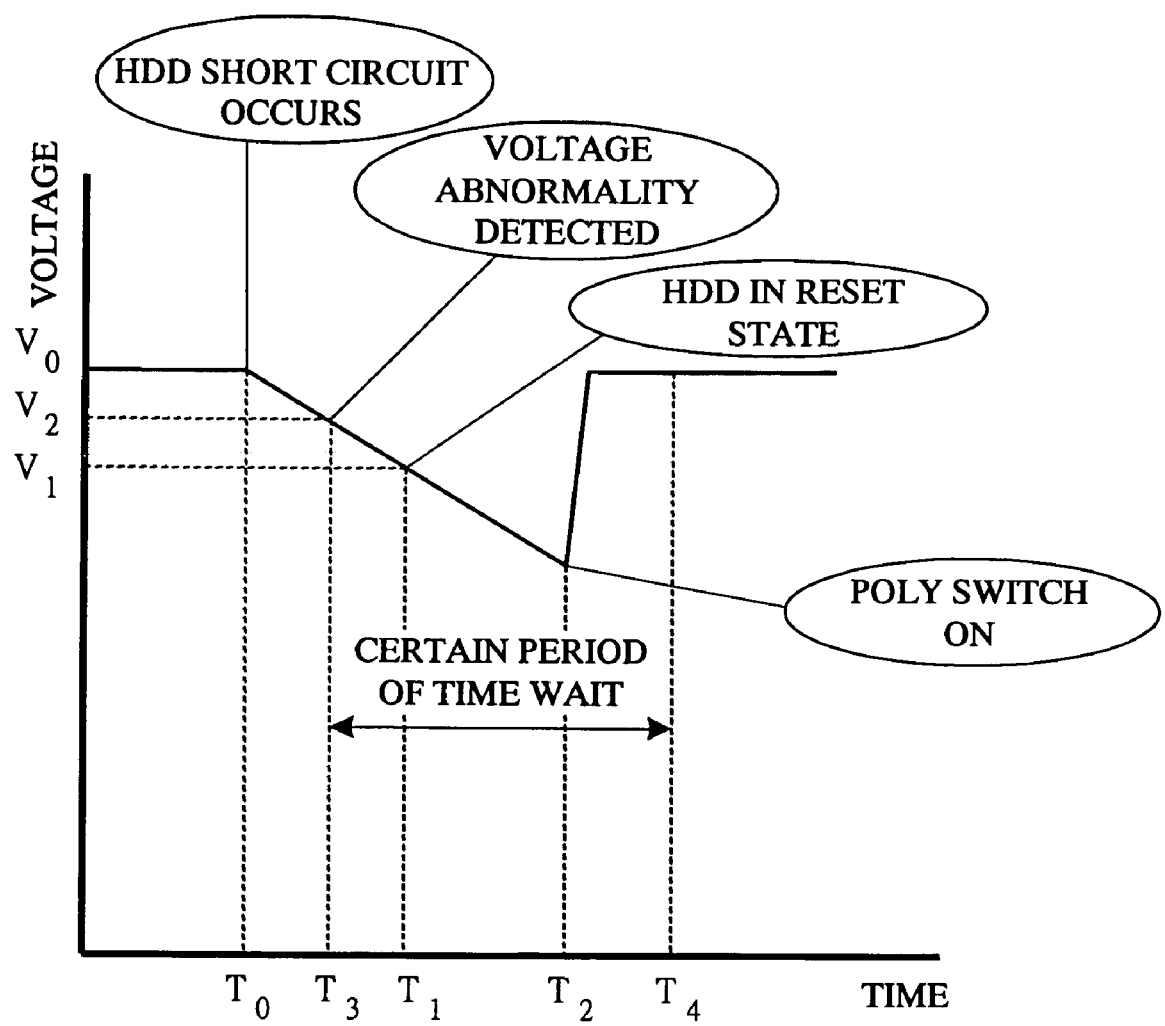
FIG. 16 is a view showing the change of the voltage at the time of short circuit of the power source line in the storage apparatus according to the fourth embodiment of the present invention.

Next, the operation at the time of short circuit of the power source line in a storage apparatus according to a fourth embodiment of the present invention will be described with reference to FIGS. 15 and 16. FIG. 15 is a flowchart showing the operation at the time of short circuit of the power source line in the storage apparatus according to the fourth embodiment of the present invention, and FIG. 16 is a view showing a change of a voltage at the time of short circuit of the power source line in the storage apparatus according to the fourth embodiment of the present invention.

First, as shown in FIG. 5, when a short circuit occurs in the power source line of the hard disk drive (D1) 201, the poly switch 210 is turned ON by the same operation as that of the first embodiment shown in FIG. 3.

The operation in the case where a short circuit occurs in the power source line of a hard disk drive (D1) 201 and a voltage abnormality is detected by a power source line monitor circuit 240 will be described with reference to FIG. 15. That is, after the occurrence of the short circuit in the power source line of the hard disk drive (D1) 201 (S150), when a voltage abnormality is detected by the power source line monitor circuit 240 (S151), a certain period of waiting time is set, and an access from the host 300 is made to wait until the certain period of time passes (S152).

After a certain period of time in S152, it is determined whether or not a plurality of hard disk drives 201 are abnormal (S153), and when the plurality of hard disk drives 201 are determined not to be abnormal in S153, it is not that the short circuit occurs in the power source line of the hard disk drive 201 and all the hard disk drives 201 are put into a reset state, but that one hard disk drive 201 is abnormal. Therefore, the hard disk drive 201 is shut down (S154).

Further, when the plurality of hard disk drives 201 are determined to be abnormal in S153, it is determined that the short circuit occurs in the power source line of the hard disk drive 201 and all the hard disk drives 201 are put into a reset state, and a spin up command is transmitted to all the hard disk drives 201 (S155), and after the activation of each hard disk drive 201, the operation proceeds to the ordinary access process.

As a result of the activation of the hard disk drives 201 by the transmission of the spin up command in S155, the hard disk drive 201 not capable of the spin up is shut down (S156).

By this operation, for example, even when the short circuit occurs in the power source line of the hard disk drive (D1) 201, the access from the host 300 is put into a waiting state from the time when the voltage abnormality is detected by the power source line monitor circuit 240 to the time when the poly switch 210 connected to the hard disk drive (D1) 201 in which the short circuit occurs in the power source line is turned ON.

Thereafter, the spin up command is transmitted to all the hard disk drives 201, and only the hard disk drive (D1) 201 in which the short circuit occurs in the power source line is shut down. Also, the other hard disk drives (D0, D2, D3, and D4) 201 are not shut down, and can continue the ordinary operation.

Hence, since the plurality of hard disk drives 201 are not shut down, it is possible to prevent the data lost.

Similar to the first embodiment, the hard disk drive (D1) 201 which is shut down is subsequently exchanged by a correction copy and a copy back, and can continue to perform the ordinary operation.

As a certain period of time which is set as the waiting time in S152 of FIG. 15, as shown in the change of the voltage of FIG. 16, the period of time is set, that is, from the time $T_3$ at which the voltage abnormality at the voltage $V_2$ is detected after the point where the short circuit occurs in the power source line of the hard disk drive 201 and before the voltage of the power source line 220 becomes equal to or lower than the operating voltage $V_1$ of the hard disk drive 201 to the time $T_4$ subsequent to the time $T_2$ in which the poly switch 210 is turned ON.

In this way, after the passage of a certain period of time, the poly switch 210 connected to the hard disk drive (D1) 201 in which the short circuit occurs in the power source line is turned ON, and the power supply to the hard disk drive (D1) 201 is shut off, and therefore, the voltage is returned to $V_0$. At this point of time, when the spin up command is transmitted to each hard disk drive 201, the normal hard disk drive 201 can be activated as usual.

In this embodiment, by the detection of the voltage abnormality by the power source line monitor circuit 240, the access from the host 300 is made to wait until a certain period of time passes. However, it is also possible to make the access from the host 300 wait until the poly switch 210 connected to the hard disk drive 201 in which the short circuit occurs in the power source line is turned ON and the voltage abnormality is not detected by the power source line monitor circuit 240.

Further, even when the SATA drive is connected similarly to the second embodiment, by setting a certain period of waiting time when the abnormality of the hard disk drive 201 of the SATA drive is detected and by making the access from the host 300 wail until the certain period of time passes, it becomes possible to perform the same operation as described in this embodiment.

Fifth Embodiment

In the fifth embodiment, in the case where the short circuit and the like occur in the power source line of the hard disk drive 201 and a fault occurs in one of two data lines of the hard disk drive 201 due to the short, the access from the host is handled by the other data line.

The configuration of a storage apparatus 10 of the fifth embodiment is the same as that of the first embodiment.

<Operation at the Time of Data Line Fault>

Figure 17:
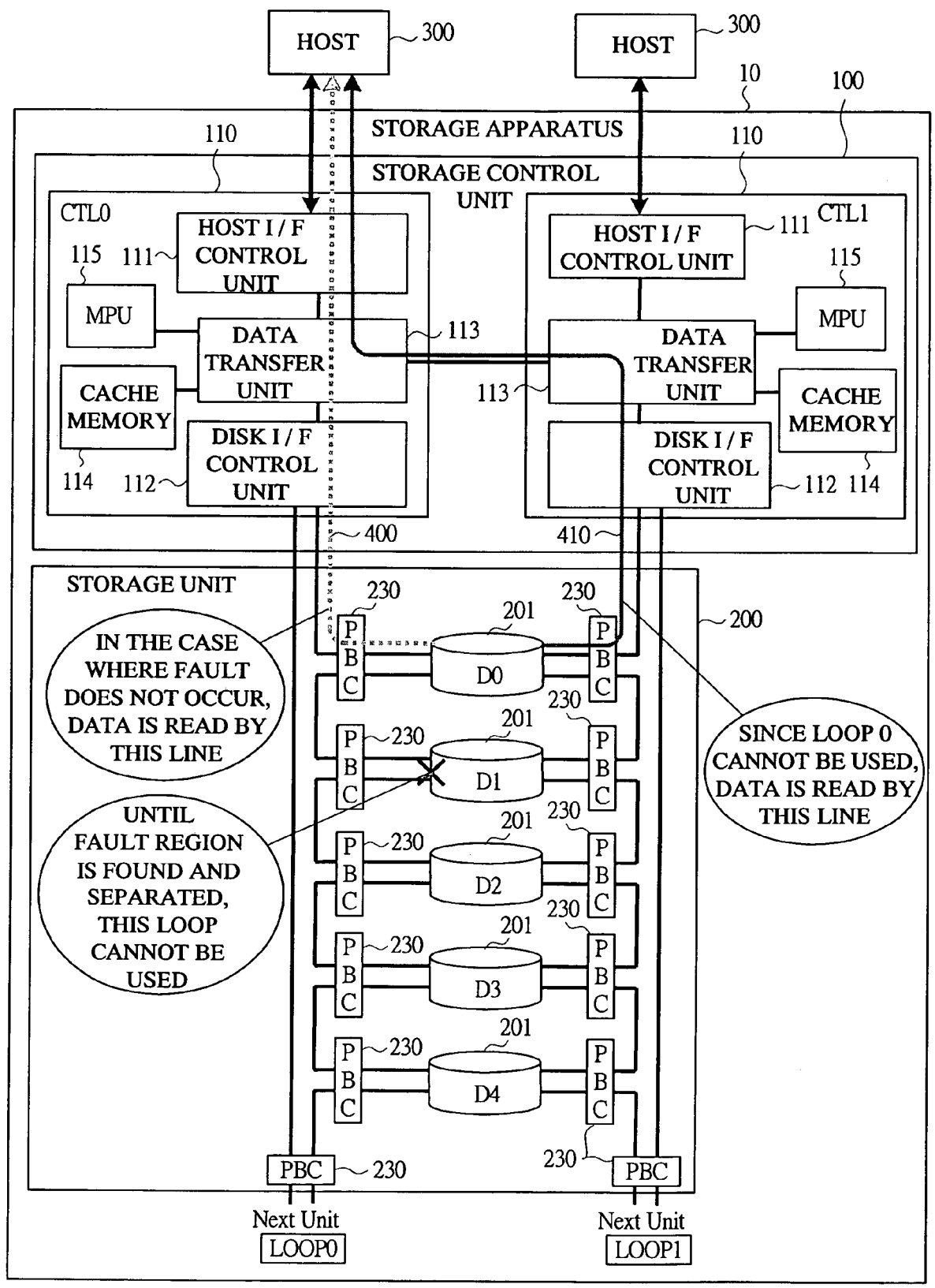
FIG. 17 is an explanatory drawing for explaining the operation at the time of short circuit of the data line in the storage apparatus according to a fifth embodiment of the present invention.

The operation at the time of a data line fault in the storage apparatus according to a fifth embodiment of the present invention will be described with reference to FIG. 17. FIG. 17 is an explanatory drawing for explaining the operation at the time of the data line fault in the storage apparatus according to the fifth embodiment of the present invention.

First, in an ordinary state in which no fault occurs, storage controller boards (CTL0 and CTL1) 110 inside the storage control unit 100 process the access to the hard disk drives 201 from different hosts 300, respectively.

For example, the host 300 connected to the storage controller board (CTL0) 110 accesses, for example, to a hard disk drive (D1) 201 by using a line denoted by reference numeral 400 of FIG. 17.

In this state, for example, in the case where the short circuit occurs in the power source line of the hard disk drive (D1) 201, and as a result, a fault occurs also in the data line, since the data line has a loop-shape, all the data lines of a loop 0 connected to the storage controller board (CTL0) 110 are put into an unserviceable state when the fault occurs in the data line of the hard disk drive (D1) 201.

In this case, the loop 0 of the data line on the storage controller board (CTL0) 110 side cannot be used until a separation process of the fault is performed to determine a fault region and the hard disk drive 201 in which the data line becomes abnormal is separated.

Hence, in this embodiment, when the fault occurs in the one data line connected to the hard disk drive 201, the access from the host 300 is processed by using the other data line as shown by the reference numeral 410 of FIG. 17.

In this way, even when the separation process of the fault is being performed, the access from the host 300 can be processed, and the response time can be made faster.

In the coordination process between the storage controller boards (CTL0 and CTL1) 110 at the time of the data line fault, for example, a dual writing for the accesses from the hosts 300 is done in both cache memories 114 inside the storage controller boards (CTL0 and CTL1) 110, and both the storage controller boards (CTL0 and CTL1) 110 are put into a state capable of handling the accesses from the hosts 300.

When the data line is abnormal, data transfer paths of the data transfer units 113 inside the storage controller boards (CTL0 and CTL1) 110 are changed. For example, the access from the host 300 connected to the storage controller board (CTL0) 110 in which the data line is abnormal is made to the hard disk drive 201 by a line shown by the reference numeral 410 of FIG. 17 through the data transfer unit 113 of the storage controller board (CTL1) 110.

Thereafter, in the loop 0 in which the fault occurs in the data line, the separation process of the fault is performed, and after the determination of the hard disk drive 201 of the fault region and the process for shutting down the hard disk drive 201 determined as the fault region are performed, the data line is restored to the original loop state, and the access from the storage controller board (CTL0) 110 is started.

Further, similar to the first embodiment, the hard disk drive 201 which is shut down is subsequently exchanged by a correction copy and a copy back, and can continue to perform the ordinary operation.

Even when the fault occurs in the data line of the hard disk drive (D1) 201 and both of the loop 0 and the loop 1 connected to the storage controller boards (CTL0 and CTL1) 110 are put into an unserviceable state, a determination process of the fault region is performed by the one loop, and an access to a storage unit 200 connected to a separate chassis is made by the other loop. By doing so, the response time in the case where the storage unit 200 of the separate chassis is connected can be made faster.

<Operation at the Time of Determining Fault Region>

Figure 18:
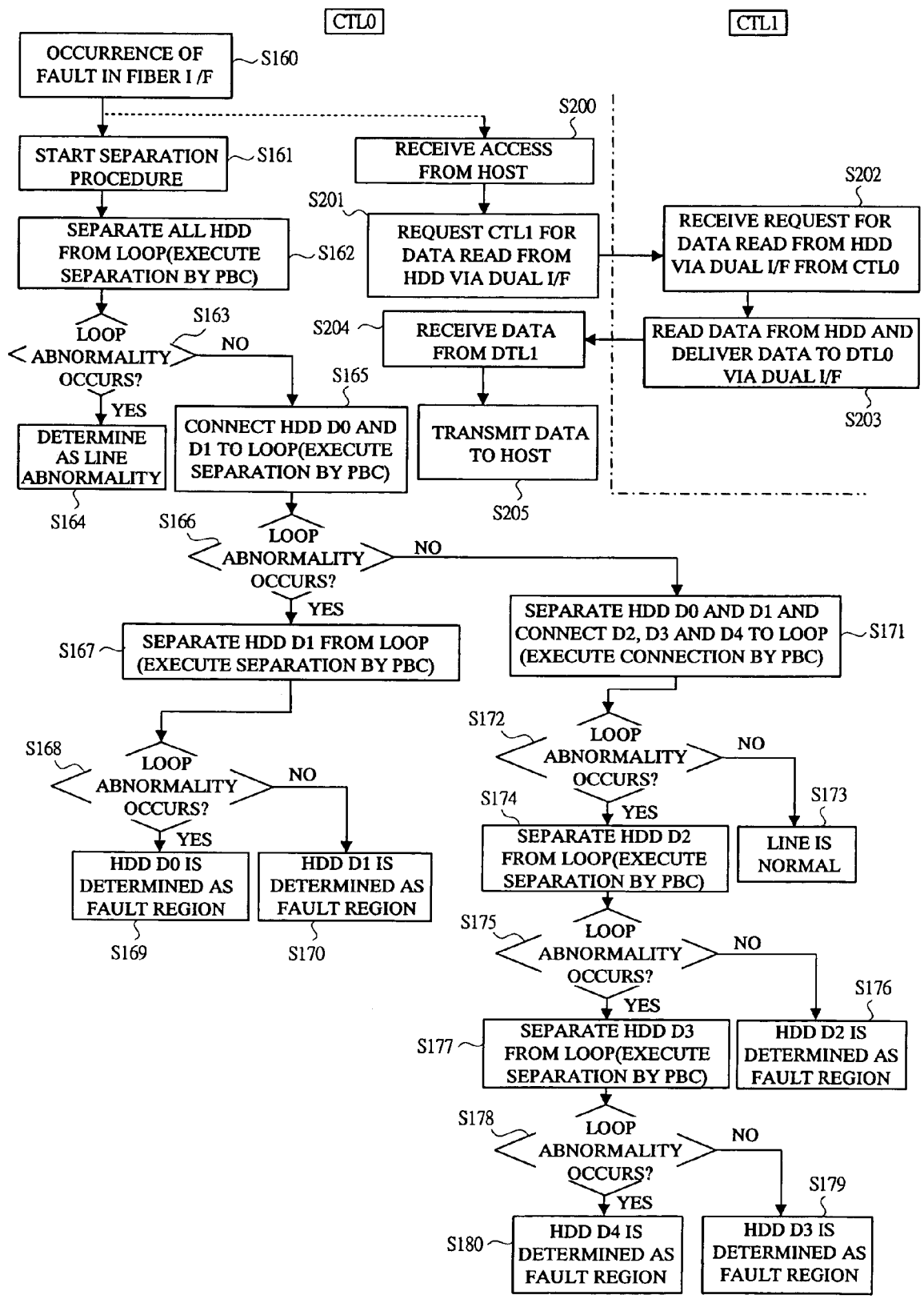
FIG. 18 is a flowchart showing a determination operation of a fault region in the storage apparatus according to the fifth embodiment of the present invention.

Next, the operation at the time of determining the fault region in the storage apparatus according to the fifth embodiment of the present invention will be described with reference to FIG. 18. FIG. 18 is a flowchart showing the operation at the time of determining the fault region in the storage apparatus according to the fifth embodiment of the present invention.

First, when the occurrence of the fault of the fiber interface is detected (S160), the separation procedure is started (S161).

Then, all the hard disk drives (D0, D1, D2, D3 and D4) 201 are separated from the loops by the port bypass circuits 230 (S162), and it is determined whether or not a loop abnormality occurs (S163).

When it is determined that the loop abnormality occurs in S163, it is determined not to be the fault of the hard disk drive 201 but to be a line fault of the fiber line itself (S164).

Further, when it is determined that the loop abnormality does not occur in S163, the hard disk drives (D0 and D1) 201 are connected to the loops by the port bypass circuits 230 (S165), and it is determined whether or not the loop abnormality occurs (S166).

When it is determined that the loop abnormality occurs in S166, the hard disk drives (D0 and D1) 201 currently connected are determined to be abnormal, and the hard disk drive (D1) 201 is separated from the loop by the port bypass circuit 230 (S167), and it is determined whether or not the loop abnormality occurs (S168).

When it is determined that the loop abnormality occurs in S168, the hard disk drive (D0) 201 currently connected is determined to be abnormal, and the hard disk drive (D0) 201 is determined as the fault region (S169).

Further, when it is determined that the loop abnormality does not occur in S168, the hard disk drive (D1) 201 separated in S167 is determined to be abnormal, and the hard disk drive (D1) 201 is determined as the fault region (S170).

Further, when it is determined that the loop abnormality does not occur in S166, the hard disk drives (D2, D3, and D4) 201 are determined to be abnormal. Then, the hard disk drives (D0 and D1) 201 are separated from the loops by the port bypass circuits 230, the hard disk drives (D2, D3 and D4) 201 are connected to the loops (S171), and it is determined whether or not the loop abnormality occurs (S172).

When it is determined that the loop abnormality does not occur in S172, it is determined that there is a possibility of erroneous detection of the occurrence of the fiber interface fault, and the fiber line is taken as normal (S173). When the occurrence of the fiber interface fault is detected again, the process subsequent to S160 is executed.

Further, when it is determined that the loop abnormality occurs in S172, the hard disk drives (D2, D3 and D4) 201 currently connected are determined to be abnormal. Then, the hard disk drive (D2) 201 is separated from the loop by the port bypass circuit 230 (S174), and it is determined whether or not the loop abnormality occurs (S175).

When it is determined that the loop abnormality does not occur in S175, the hard disk drive (D2) 201 separated in S174 is determined to be abnormal, and the hard disk drive (D2) 201 is determined as the fault region (S176).

Further, when it is determined that the loop abnormality occurs in S175, the hard disk drives (D3 and D4) 201 currently connected are determined to be abnormal, and the hard disk drive (D3) 201 is separated from the loop by the port bypass circuit 230 (S177), and it is determined whether or not the loop abnormality occurs (S178).

When it is determined that the loop abnormality does not occur in S178, the hard disk drive (D3) 201 separated in S177 is determined to be abnormal, and the hard disk drive (D3) 201 is determined as the fault region (S179).

Further, when it is determined that the loop abnormality occurs in S178, the hard disk drives (D4) 201 currently connected is determined to be abnormal, and the hard disk drive (D4) 201 is determined as the fault region (S180).

By the above described process, the fault region is determined and the loops can be recovered while the hard disk drive 201 determined as the fault region is shut down.

Further, when performing the determination process of the fault region by the above-described steps S160 to S180 on the storage controller board (CTL0) 110 side, for example, the fiber line of the loop 0 cannot be used in the storage controller board (CTL0) 110. Therefore, when the access from the host 300 connected to the storage controller board (CTL0) 110 is received, a data read process is performed by using a dual interface of the hard disk drive 201 through a line of the dual interface on the storage controller board (CTL1) 110 side via the other storage controller board (CTL1) 110.

As the operation in this case, first, when an access is received from the host 300 connected to the storage controller board (CTL0) 110 (S200), the storage controller board (CTL1) 110 is coordinated with the data transfer units 113 of the storage controller boards (CTL0 and CTL1) 110, and thus, a request for data read from the hard disk drive 201 via the dual interface of the hard disk drive 201 is issued (S201).

In the storage controller board (CTL1) 110, the request for data read from the hard disk drive 201 via the dual interface is received from the storage controller board (CTL0) 110 (S202), the data from the hard disk drive 201 is read, and the data is delivered to the storage controller board (CTL0) 110 via the dual interface (S203).

Then, in the storage controller board (CTL0) 110, the data from the storage controller board (CTL1) 110 is received (S204), and the data received in S204 is transmitted to the host 300 (S205).

Further, even when the data line abnormality occurs on the storage controller board (CTL1) 110 side, the process for the access from the host 300 connected to the storage controller board (CTL1) 110 is performed by the same processes as describe above.

By the above-described processes, even when the determination process of the fault region is performed, the process for the access from the host 300 can be performed, and the response time for the host 300 in the case where the fault occurs in the date line can be made faster.

In the foregoing, the invention made by the inventor of the present invention has been concretely described based on the embodiments. However, it is needless to say that the present invention is not limited to the foregoing embodiments and various modifications and alterations can be made within the scope of the present invention.

The effects achieved by representative ones of the inventions disclosed in this application will be briefly described as follows.

According to the present invention, even when the short-circuit fault occurs in the power source line not made redundant for a plurality of hard disk drives, the data lost can be avoided.

What is claimed is:

1. A storage apparatus, comprising: a storage control unit; and a storage unit composed of a plurality of physical storage devices, wherein said storage control unit includes: a host interface control unit for controlling a data transfer with a host device; a disk interface control unit for controlling the data transfer with said storage unit; a cache memory for temporarily storing said data; and a data transfer unit which is connected to said host interface control unit, said disk interface control unit, and said cache memory, and controls the data transfer, said storage unit is provided for each power source line to said plurality of physical storage devices and includes a switch for shutting the power supply to said physical storage device when an excess current to said physical storage device is detected and a power source line monitor circuit for monitoring a voltage of said power source line, and when a voltage abnormality due to a voltage drop of said power source line is detected by said power source line monitor circuit, a data line connecting said disk interface control unit and said plurality of physical storage devices is cut off.

2. The storage apparatus according to claim 1, wherein said power source line monitor circuit detects the voltage abnormality before said physical storage device becomes inoperative due to the voltage drop of said power source line.

3. The storage apparatus according to claim 1, wherein, when the voltage abnormality of said power source line is not detected by said power source line monitor circuit after cutting off said data line, said cut-off data line is restored and an activation command is transmitted to said plurality of physical storage devices.

4. The storage apparatus according to claim 1, wherein, after cutting off said data line, said cut-off data line is restored after a certain period of time, and an activation command is transmitted to said plurality of physical storage devices.

5. The storage apparatus according to claim 4, wherein said certain period of time is set as a time period from the time when the power source line inside said physical storage device is short-circuited to the time when the power source is shut off by said switch.

6. The storage apparatus according to claim 1, wherein a port bypass circuit is connected between said data line and said physical storage device, and said data line is cut off by said port bypass circuit.

7. The storage apparatus according to claim 1, wherein said data line is a fiber channel loop or a serial ATA interface.

8. The storage apparatus according to claim 1, wherein said storage control unit comprises: said host interface control unit; said disk interface control unit; said cache memory; and two systems of data transfer units, an access process to said plurality of physical storage devices is performed by said two systems of data lines based on the access from different host devices, and when there is an abnormality in a data line of the one system of said two systems, the data transfer is performed between said two systems of data transfer units, and the access process for the access from either of said different two host devices to said plurality of physical storage devices can be performed by the data line of the other system.

9. A storage apparatus, comprising: a storage control unit; and a storage unit composed of a plurality of physical storage devices, wherein said storage control unit includes: a host interface control unit for controlling a data transfer with a host device; a disk interface control unit for controlling the data transfer with said storage unit; a cache memory for temporarily storing said data; and a data transfer unit which is connected to said host interface control unit, said disk interface control unit, and said cache memory, and controls the data transfer, said storage unit is provided for each power source line to said plurality of physical storage devices and includes a switch for shutting the power supply to said physical storage device when an excess current to said physical storage device is detected, and when the abnormality of said physical storage device is detected, said storage control unit allows an access to said physical storage device from said host device to wait until a certain period of time passes.

10. The storage apparatus according to claim 9, wherein the detection of the abnormality of said physical storage device by said storage control unit is made by the detection that the voltage of the power source supplied to said physical storage device is lowered and thus said physical storage device becomes inoperative.

11. The storage apparatus according to claim 9, wherein the detection of the abnormality of said physical storage device by said storage control unit is made by the detection that the power source line inside said physical storage device is short-circuited and becomes inoperative.

12. The storage apparatus according to claim 9, wherein said certain period of time is set as a time period from the time when the power source line inside said physical storage device is short-circuited to the time when the power source is shut off by said switch.

13. The storage apparatus according to claim 9, wherein, when said plurality of physical storage devices are abnormal after said certain period of time, said storage control unit transmits an activation command to said plurality of physical storage devices.

14. The storage apparatus according to claim 13, wherein, after transmitting said activation command, said storage control unit shuts down said physical storage device which is incapable of being activated.

15. The storage apparatus according to claim 9, wherein said storage control unit comprises: said host interface control unit; said disk interface control unit; said cache memory; and two systems of data transfer units, an access process to said plurality of physical storage devices is performed by said two systems of data lines based on the access from different host devices, and when there is an abnormality in a data line of the one system of said two systems, the data transfer is performed between said two systems of data transfer units, and the access process for the access from either of said different two host devices to said plurality of physical storage devices can be performed by the data line of the other system.

16. The storage apparatus according to claim 9, wherein said storage device includes a power source line monitor circuit for monitoring the voltage of said power source line, and when the voltage abnormality due to the voltage drop of said power source line is detected by said power source line monitor circuit, said storage control unit allows an access to said physical storage device from said host device to wait until a certain period of time passes.

17. The storage apparatus according to claim 16, wherein said certain period of time is set as a time period from the time when the power source line inside said physical storage device is short-circuited to the time when the power source is shut off by said switch.

18. The storage apparatus according to claim 16, wherein, when said plurality of physical storage devices are abnormal after said certain period of time, said storage control unit transmits an activation command to said plurality of physical storage devices.

19. The storage apparatus according to claim 16, wherein, after transmitting said activation command, said storage control unit shuts down said physical storage device which is incapable of being activated.

20. The storage apparatus according to claim 16,
wherein said storage control unit comprises: said host interface control unit; said disk interface control unit; said cache memory; and two systems of data transfer units,
an access process to said plurality of physical storage devices is performed by said two systems of data lines based on the access from different host devices, and
when there is an abnormality in a data line of the one system of said two systems, the data transfer is performed between said two systems of data transfer units, and the access process for the access from either of said different two host devices to said plurality of physical storage devices can be performed by the data line of the other system.

* * * * *